United States Patent [19]

Bexten

[11] B 3,984,085

[45] Oct. 5, 1976

[54] ADJUSTABLE FAIRLEAD ROLLER SYSTEM

[75] Inventor: Eugen J. Bexten, Ancaster, Canada

[73] Assignee: International Harvester Company, Chicago, Ill.

[22] Filed: July 18, 1974

[21] Appl. No.: 489,685

[44] Published under the second Trial Voluntary Protest Program on February 24, 1976 as document No. B 489,685.

[52] U.S. Cl. ............................ 254/190 R; 214/85.5

[51] Int. Cl.[2] ......................... B66D 1/36; B60P 3/00

[58] Field of Search ............... 214/523, 85.5; 212/7; 254/139.1, 190 R

[56] References Cited

UNITED STATES PATENTS

| | | | |
|---|---|---|---|
| 3,515,297 | 6/1970 | Symons | 214/85.5 |
| 3,576,266 | 4/1971 | Widley | 214/85.5 |

*Primary Examiner*—Albert J. Makay

*Attorney, Agent, or Firm*—Floyd B. Harman; William H. Wendell

[57] ABSTRACT

An adjustable fairlead roller system which uses a winch to pivotally vary the position of the fairlead roller assembly on a logging arch.

11 Claims, 4 Drawing Figures

ADJUSTABLE FAIRLEAD ROLLER SYSTEM

BACKGROUND OF THE INVENTION

This invention relates generally to a log skidder and more particularly concerns the adjustability of the fairlead roller which guides the winch cable.

During operation of log skidders that use a winch to drag the log or logs into position rearward of the vehicle and to secure them during transport three problems may arise. The first problem arises during the cable dragging operation when the logs can be either directly behind the vehicle or rearward of the vehicle but offset to either side. This operation under the latter condition requires a lower vertical position of the fairlead roller than that required for the direct rear dragging because the side-tip moment is increased by the angled dragging.

The second dragging problem is caused either by the variances in the sizes of logs that the vehicle may be required to handle or by the variances in the soil conditions upon which the vehicle is required to operate. The larger log diameters and drier terrain require a lower vertical position of the fairlead roller to obtain maximum dragging efficiency, while the small log diameters and swampy soil conditions require a high vertical location of the fairlead roller to obtain the same efficiency in dragging. The third problem arises from varying the horizontal position of the roller with respect to the butt pan surface when the vertical adjustments are made. If this horizontal position varies outside the normally acceptable range, the load being transported may either act as a rudder or adversely affect the load distribution necessary for proper steering.

The existing adjustable fairlead roller systems do not adequately provide solutions to these problems. These systems all require excessive manual handling of the very heavy elements of the logging arch. Two of the systems also produce an unacceptable horizontal position variation with respect to the butt plates. Accordingly, it is the primary aim of the present invention to overcome the problems of prior systems while providing a functional and practical means for adjusting the vertical position of the fairlead roller using the power of a winch to control the heavy elements of the machine.

With more particularity, it is an object of the present invention to provide a fairlead roller adjusting system where the horizontal distance traversed from the low to the high positions is within the normally acceptable range to insure adequate steering.

Similarly, it is an object of the present invention to provide a system which requires a minimum of manual handling of the elements of the machine.

Another object is to provide a method of pivotal adjustment of the vertical location of the fairlead roller which utilizes the power of the vehicle's self-contained power source to relocate the roller.

Finally, it is an object of the present invention to provide a system in which restraints on the adjustable fairlead roller assembly are redundant thereby rendering the adjustment procedure relatively safe to personnel in and around the vehicle.

SUMMARY OF THE INVENTION

In accordance with the invention the adjustable fairlead system will function on a log skidder which has a frame, a power source mounted on the frame and a winch, driven by the power source, mounted on the frame. The system comprises a fairlead roller assembly connected to the frame and capable of pivotal and walking vertical position adjustment, a logging arch mounted on the frame and capable of rigidly supporting and pivotally adjusting the vertical position of the fairlead roller assembly, and an adjusting means operably connecting the vehicle winch and the fairlead roller assembly thereby making the winch provide the power to make the position changes of the assembly.

BRIEF DESCRIPTION OF THE DRAWINGS

Other objects and advantages of the invention will become apparent upon reading the following detail description and upon reference to the drawings, in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DESCRIPTION OF THE PREFERRED EMBODIMENT

In the operation of a log skidder the variance in log size, soil conditions and the direction from which they must be dragged require a vertically adjustable connection of the fairlead roller to the frame of the log skidder. This adjustability will avoid problems of side tipping and ensure stability during transport. In the present embodiment the vertical adjustability of the fairlead roller is achieved without an excessive horizontal component and without man supplying the manipulating power.

Figure 1:
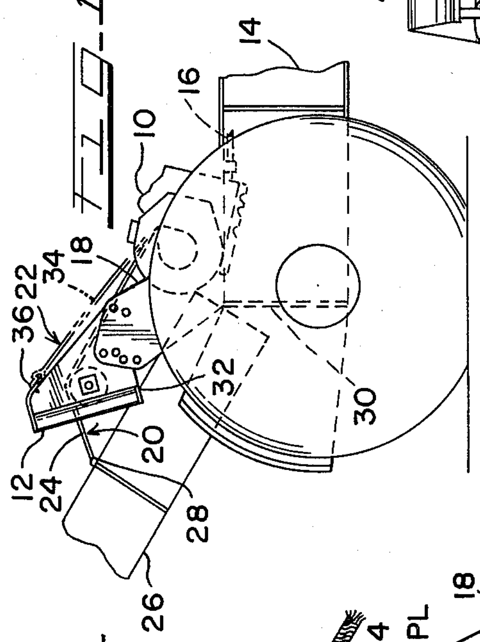
FIG. 1 is a side view of the rear portion of a log skidder depicting the fairlead roller assembly during the adjusting procedure.

Turning now to the drawings, the power supply for the adjustments is depicted in FIG. 1. This side view shows two preferred methods for substituting the power of the vehicle's winch 10 for manpower in the adjusting of the fairlead roller assembly 12. In the preferred embodiment the winch 10 is rigidly mounted on the frame 14 and is driven by the vehicle engine (not shown) through the drive train 16.

In the present instance the logging arch 18 is also rigidly attached to the frame 14 with the fairlead roller assembly 12 mounted on the logging arch 18. This latter mounting is capable of being either rigid during the operation of the dragging function of the vehicle or pivotal during the vertical adjusting of the fairlead roller assembly 12 to a new position.

During the vertcal adjusting procedure the winch 10 controls the position of the fairlead roller assembly 12 through either of the illustrated adjusting means 20 or 22. Adjusting means 20 includes a winch cable 24 and a connecting means 26 which is a log capable of being chokingly connected at point 28 to the cable 24 and having one end wedged against the butt plate 30. The log 26 supports the fairlead roller assembly 12 when the winch 10 retracts cable 24, thereby the rearward end of the log 26 and making the log 26 contact the fairlead roller assembly 12 at point 32.

The other adjusting means 22 includes a winch cable 34 and an adjusting means 36 which is a hook attached to the cable 34, at point 38. This hook connects cable 34 to the fairlead roller assembly 12 by being passed through hole 40, depicted in FIGS. 2 and 3. With this hook connection the weight of the fairlead roller assembly 12 will be supported without any manipulation by man when the winch 10 retracts cable 34.

Thus in the present embodiment the only manpower required to adjust the vertical height of the fairlead roller assembly 12 is that necessary to loosen, remove and relocate the bolts B and nuts N that rigidly secure the fairlead roller assembly to the logging arch 18. In the illustrated form shown in FIG. 2 the bolts B are shown in the second highest position H2 of the fairlead roller assembly 12 shown in the solid line elements. This view also shows the use of connecting means 22 for description purposes.

Figure 4:
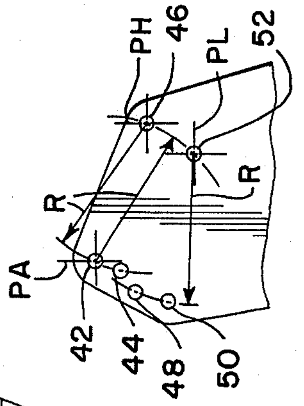
FIG. 4 is a side view of the logging arch showing the arch holes which are used to mount the fairlead roller assembly.

In the preferred construction there is a plurality of holes in the logging arch 18 that can be divided into two sets, shown in FIG. 4. The high location set includes arch holes 42 and 44 which are an equal radial distance R from arch holes 46. The lower location set of holes in the logging arch 18 includes arch holes 48 and 50 which are in equal radial distance R from arch hole 52. As indicated by the label R used above both the high location and low location holes radial displacements are equal.

Figure 2:
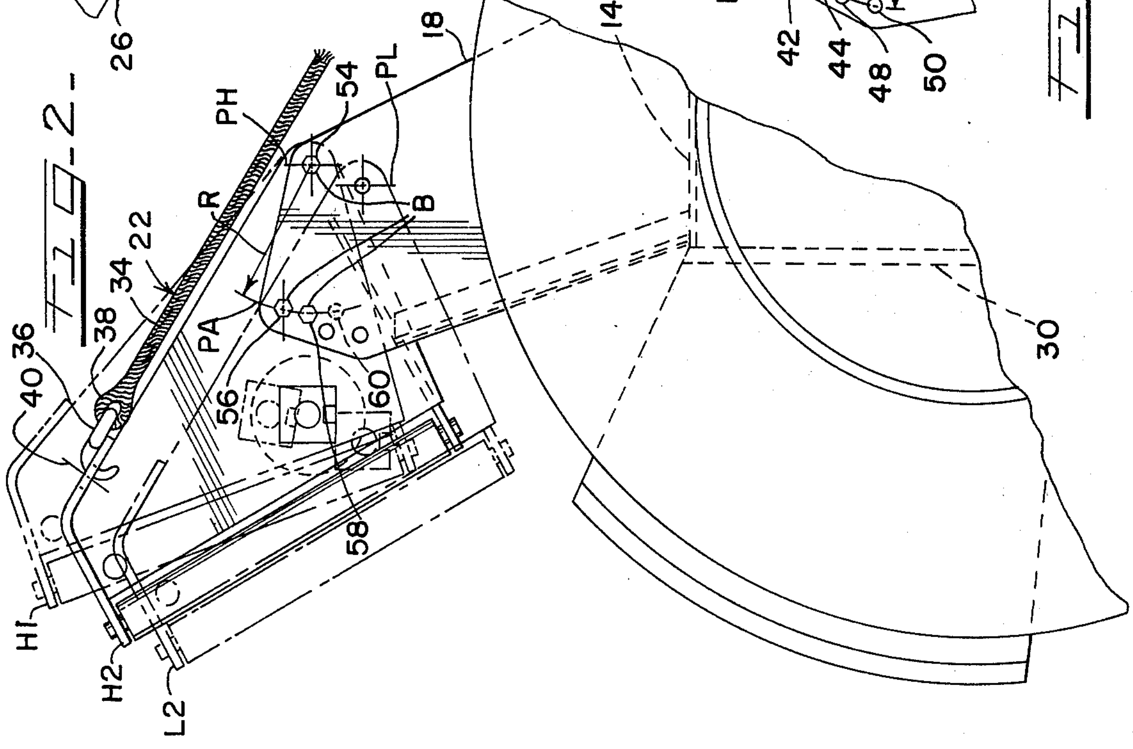
FIG. 2 is a detailed side view of a major portion of the logging arch shown in FIG. 1 depicting the pivotal movement of the fairlead roller assembly.
Figure 3:
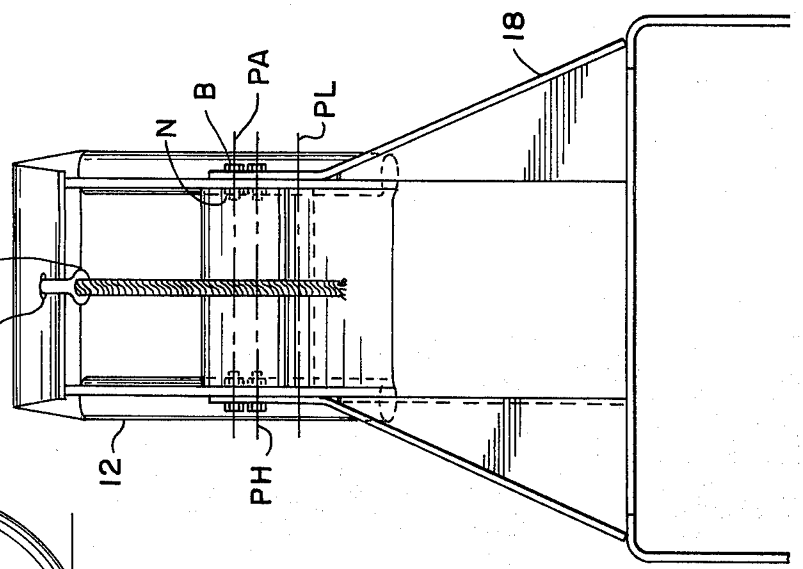
FIG. 3 is a front view of the fairlead roller assembly and logging arch.

In carrying out the invention, this radial displacement R is also the displacement between arch holes 42 and arch holes 52, and is the radial distance between roller assembly hole 54 and roller assembly holes 56, 58 and 60, shown in FIGS. 2 and 4. This equality of radial displacement permits the operator to pivotally adjust the fairlead roller assembly 12 from the high location set of holes, 42, 44, and 46 to the low location set of holes 48, 50 and 52.

In the illustrated form when the highest position is the one required, the vehicle operator would loosen the securing bolts B and nuts N, attach the hook 36 to hole 40, and retract the cable 34 by winding it about winch 10 until the weight of the fairlead roller assembly 12 is supported thereby. He would then remove the rearward bolts from arch holes 42 and 44, and wind more of cable 34 about winch 10 thereby pivoting the fairlead roller assembly 12 clockwise about pivot centerline PH until the roller assembly holes 58 and 60 align with arch holes 42 and 44, respectively. By now replacing bolts B and nuts N into the aligned holes and tightening all bolts and nuts, the fairlead roller assembly 12 will be rigidly attached to the logging arch 18 in its highest operating position H1.

With the fairlead roller assembly 12 in either the highest position H1 or the second highest position H2, the operator can put the fairlead roller assembly 12 into either the lowest position (not shown) or the second lowest position L2 by loosening all securing bolts B and nuts N in their existing location and attaching the connecting means 22 to the fairlead roller assembly 12 as depicted in FIG. 2. He will then make the fairlead roller assembly 12 walk down the logging arch 18 by alternating the direction of the fairlead roller assembly's 12 pivotal movement. His first step will be to wind cable 34 on winch 10 until cable 34 and hook 36 support the weight of the fairlead roller assembly 12, and remove bolts B and nuts N from arch holes 44 and 46.

The operator's next step is to wind more of cable 34 on winch 10 thereby pivoting the fairlead roller assembly 12 clockwise about adjusting pivotal centerline PA until roller assembly holes 54 align with arch holes 52. He must then loosely secure bolts B in arch holes 52 with nuts N and then remove bolts B and nuts N from arch holes 42. The next steps to establish the second lowest L2 or lowest (not shown) position of the fairlead roller assembly is for the vehicle operator to unwind cable 34 using winch 10, thereby rotating the fairlead roller assembly 12 counterclockwise about pivot centerline PL until either of the following sets of holes are in alignment. For obtaining the second lowest position L2 of the fairlead roller assembly 12 arch holes 48 and 50 should align with roller assembly holes 58 and 60, respectively, while for the lowest position L1 of the fairlead roller assembly 12 arch holes 48 and 50 should align with roller assembly holes 56 and 58, respectively. The final step for the operator is to rigidly secure bolts B with nuts N in arch holes 46, 48 and 50.

As is best shown in FIG. 2, the total horizontal component of the vertical adjustment of the fairlead roller assembly 12 is small and acceptable. This acceptability results from the equality of radial distances between adjusting pivotal centerline PA and pivot centerlines PL and PH, and the fact that in the preferred embodiment there is only a small angular variance from a horizontal line passage through the pivoting centerline. This small angular variance from the horizontal minimizes the horizontal displacement while maximizing the vertical displacement for any given pivoting of the fairlead roller assembly 12.

Thus it is apparent that there has been provided, in accordance with the invention an adjustable fairlead roller system that eliminates the manual manipulation of the massive machine elements, is adaptable to the full variety of log and soil conditions which a log skidder may encounter, minimizes the horizontal component of the vertical adjustment of the fairlead roller assembly, provides a method of pivotally adjusting the vertical location of the fairlead roller assembly utilizing the power of a self-contained power source to move the assembly and provides a system of adjusting the vertical location of the fairlead roller assembly in which the assembly is always restrained by a winch cable and at least two bolts and two nuts.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An adjustable fairlead roller system for a log skidder with a frame, a power source mounted on said frame, said system comprising:

a fairlead roller assembly having a plurality of apertures and capable of being rigidly connected to said frame, and capable of pivotal and walking vertical position adjustment;

a logging arch rigidly attached to said frame, and having a plurality of apertures capable of rigidly supporting and pivotally adjusting the vertical location of said fairlead roller assembly;

attaching means for adjustably connecting said fairlead roller assembly and said logging arch through said apertures; and adjusting means connecting said power source and said fairlead roller assembly for having said power source provide the power necessary to pivotally vary the vertical position of said fairlead roller assembly.

2. The combination of claim 1 wherein said rigid mounting, and said pivotal and walking adjusting capabilities of said fairlead roller assembly result from said plurality of assembly apertures having uniform radial displacement from a common pivot centerline.

3. The combination of claim 1 wherein said supporting and adjusting capabilities of said logging arch result from said plurality of arch apertures including a plurality of sets of spaced holes in spaced relationship with adjacent sets to permit walking motion of said fairlead roller assembly.

4. The combination of claim 1, wherein said supporting and adjusting capabilities of said logging arch result from said plurality of arch apertures including a plurality of sets of radially aligned apertures having a uniform radial distance from the pivot centerline of each set, and having said uniform radial distance between said pivot centerlines and said radially aligned holes of adjacent sets.

5. The combination of claim 3, further defined by said adjusting means comprising:

a winch mounted on said frame and driven by said power source;

a cable operably attached to said winch; and connecting means operably connecting said cable and said fairlead roller assembly for controlling the pivotal and walking movement of said fairlead roller assembly.

6. The combination of claim 4, further defined by said adjusting means comprising:

a winch mounted on said frame and driven by said power source;

a cable operably attached to said winch; and connecting means operably connecting said cable and said fairlead roller assembly for controlling the pivotal and walking movement of said farilead roller assembly.

7. The combination of claim 1 wherein said mounting and adjusting capabilities of said fairlead roller assembly and said supportiig and adjusting capabilities of said logging arch result from said plurality of assembly apertures having a uniform radial displacement from a common pivot centerline, and said arch apertures including a plurality of sets of spaced apertures having adjacent sets indexed by said uniform radial displacement.

8. The combination of claim 1, wherein said mounting and adjusting capabilities of said fairlead roller assembly and said supporting and adjusting capabilities of said logging arch result from said plurality of assembly apertures having a uniform radial displacement from a common pivot aperture, and said arch apertures including a plurality of sets of radially aligned apertures having said uniform distance from the pivot centerline of each set, and having said uniform radial distance between said pivot centerline and said radially aligned apertures of adjacent sets.

9. The combination of claim 2, further defined by said adjusting means comprising:

a winch mounted on said frame and driven by said power source;

a cable operably attached to said winch; and connecting means connecting said cable and said fairlead roller assembly for controlling the pivotal and walking movement of said fairlead roller assembly.

10. The combination of claim 7, further defined by said adjusting means comprising:

a winch mounted on said frame and driven by said power source;

a cable operably attached to said winch; and connecting means connecting said cable and said fairlead roller assembly for controlling the pivotal and walking movement of said fairlead roller assembly.

11. The combination of claim 8, further defined by said adjusting means comprising:

a winch mounted on said frame and driven by said power source;

a cable operably attached to said winch; and connecting means connecting said cable and said fairlead roller assembly for controlling the pivotal and walking movement of said fairlead roller assembly.

* * * * *